United States Patent [19]

Finnstrand

[11] E Re. 28,730

[45] Reissued Mar. 9, 1976

[54] STOVE AND BURNER ASSEMBLY

[75] Inventor: Harald Finnstrand, Branford, Conn.

[73] Assignee: International Telephone & Telegraph Corporation, New York, N.Y.

[22] Filed: Feb. 3, 1975

[21] Appl. No.: 546,313

Related U.S. Patent Documents

Reissue of:

[64] Patent No.: 3,807,381
Issued: Apr. 30, 1974
Appl. No.: 359,950
Filed: Apr. 13, 1973

[52] U.S. Cl. ..... 126/43; 239/582; 431/225; 431/344

[51] Int. Cl.[2] ..... F24C 5/02

[58] Field of Search ..... 239/581, 582, 458; 126/43; 431/225, 344

[56] References Cited

UNITED STATES PATENTS

| | | | |
|---|---|---|---|
| 678,792 | 7/1901 | Giradville | 239/581 X |
| 2,121,741 | 6/1938 | Lusher et al. | 239/458 |
| 2,465,572 | 3/1949 | Bramming | 431/344 |
| 2,597,775 | 5/1952 | Brown | 239/581 X |
| 3,102,691 | 9/1963 | Gall | 239/458 |

*Primary Examiner*—Edward G. Favors
*Attorney, Agent, or Firm*—Thomas L. Peterson

[57] ABSTRACT

A burner assembly for liquid fuels where a body member is rotatable about a central stem member and movable axially thereof to open a fuel valve and also to move a flow control member extending into the nozzle.

10 Claims, 5 Drawing Figures

STOVE AND BURNER ASSEMBLY

Matter enclosed in heavy brackets [ ] appears in the original patent but forms no part of this reissue specification; matter printed in italics indicates the additions made by reissue.

This invention relates to stoves, and more particularly relates to stove and burner assemblies which utilize a liquid fuel such as alcohol.

Existing stoves of this type, which are particularly adapted for use on vehicles and boats, have burners which include apparatus with forged or cast housing requiring a number of machining operations in various types of machines. These various operations and the transfer between machines substantially elevates the costs.

In vehicles such as pleasure boats, mobile homes and trailers, space is always at a premium, and a stove is generally recessed in a counter, away from the front edge thereof, in order that the stove may be covered and used as counter space, and also to avoid the creation of unusable space behind the stove. It is generally a safety requirement that the stove body or pan about the burner be a liquid tight vessel with a volume equal to that of the fuel tank to provide a reservoir for any liquid that may leak through a non-operating burner.

The burner valves used are generally needle valves with shafts extending perpendicular to the valve housing and knobs or similar devices attached to the ends of the shafts for operation of the valves. Where the stove is recessed, the center lines of the valve shafts are below the counter surfaces and in order to control the valves long extensions of the valve shafts to reach the front surfaces of the counter are required, or the valve shafts may be equipped with knobs of large diameter so that they protrude through slots in the rim of the stove, as shown in U.S. Pat. No. 3,230,947. As described in this patent the shafts extending through a vertical wall in the stove require seals about the openings to prevent any leaks. This type of sealing construction is expensive and the seals may be inclined to deteriorate with age.

Moreover, presently known burners of the type described have no definite closing position marked on the control knobs to show when the burner valves are properly closed. A needle valve has a tendency to change dimensions every time it is operated in that the closing position changes minutely every time the valve is closed.

In view of the aforementioned deficiencies and limitations in liquid fuel stoves, the present invention provides a new stove and burner assembly in which the burner assembly consists of a minimal number of parts that can be made with a minimum transfer from one machine to another; the burner operating controls are accessible from above and do not require any openings in the stove body; and the open and close positions of the burner are clearly discernible.

Briefly stated, the invention in one form thereof comprises a stove or pan having a burner mounted therein together with a control rod and handle attached to a body member of the burner and adapted to rotate the body to control the flow of fuel. Fuel is supplied to a stationary central stem member. The body member is rotatable and longitudinally movable with respect to a burner stem to open a valve to admit fuel to a nozzle and also to control the amount of fuel exiting from the nozzle by controlling the area thereof.

An object of this invention is to provide a new and improved stove and burner of the type described.

Another object of this invention is to provide a new and improved burner assembly of the type described.

A further object of this invention is to provide a new and improved burner control for stoves of the type described.

The features of the invention which are believed to be novel are particularly pointed out and distinctly claimed in the concluding portion of this specification. The invention, however, both as to its organization and operation, together with further objects and advantages thereof, may best be appreciated by reference to the following detailed description taken in conjunction with the drawings, wherein:

Figure 1:
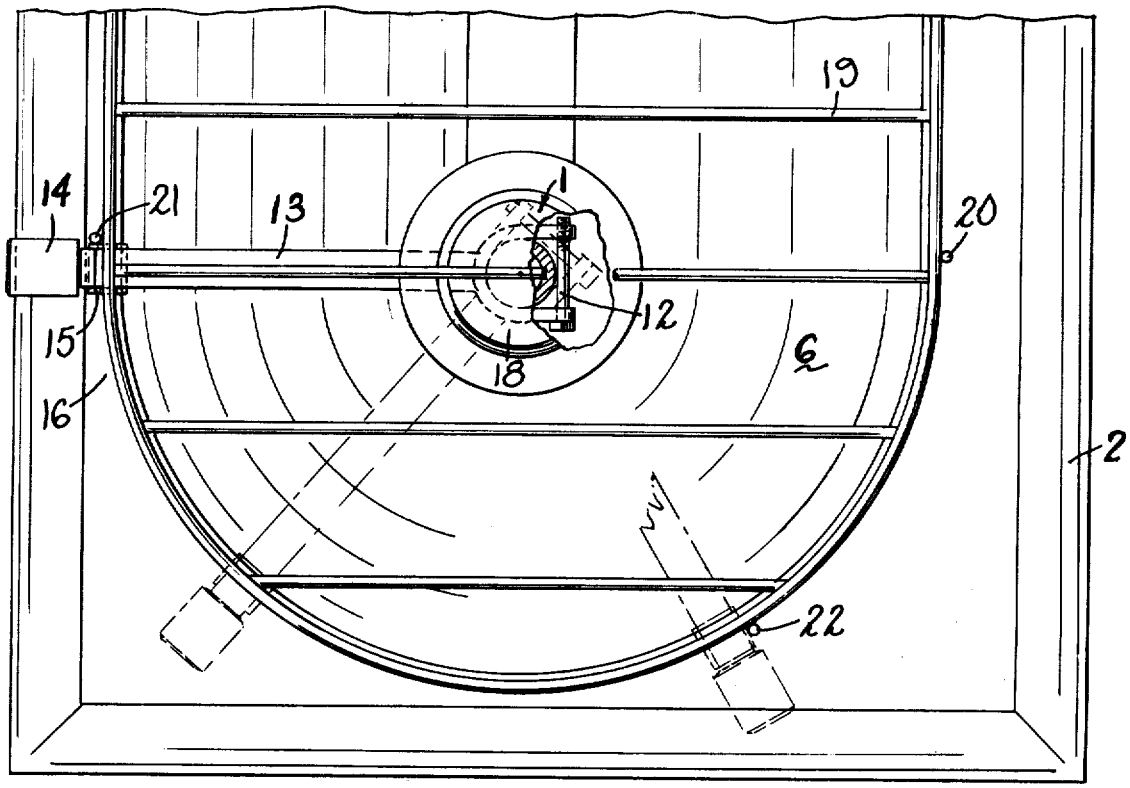
FIG. 1 is a top view of a stove embodying the invention.
Figure 2:
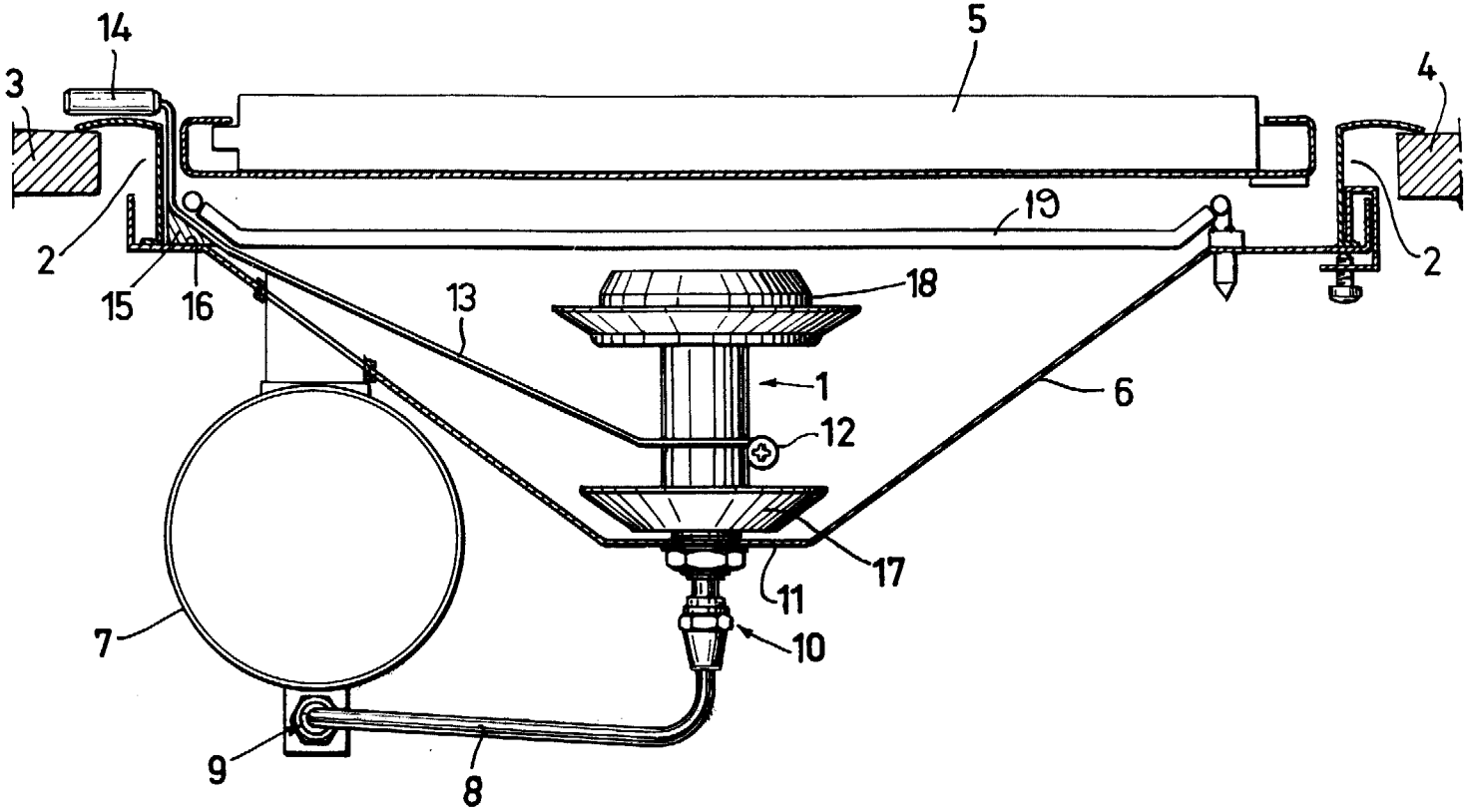
FIG. 2 is a side elevation, partly in section, of the stove of FIG. 1.

Referring initially to FIGS. 1 and 2, the stove comprises a burner 1 basically supported within a frame member 2, which is supported on a cutout in counter portions 3 and 4. A cover member 5 is adapted to be placed over the stove and supported on flanges on frame 2 by extending legs (not shown) when the stove is not in use. A dished body or pan member 6 is supported from frame 2.

A fuel reservoir tank 7 supplies a liquid fuel to burner assembly 1 through a line 8 coupled to tank 7 at 9 and connected through a coupling 10 to burner 1. Burner 1 is supported on a lower portion 11 of pan 6 as hereinafter described. A burner adjustment control member 13 having a yoke-like end is affixed to burner assembly 1 by means of a tightening device such as a bolt 12. Member 13 is movable in an arc, as indicated in FIG. 1, by means of a handle 14. A low friction material 15, such as a Teflon slide 15 attached to member 13 rides on a surface 16 of pan 6.

The burner assembly 1 includes a pre-heat dish or cup member 17 and a head 18. The reservoir tank 7 will include a pumping chamber or piston (not shown) to create a head of pressure on the fluid within tank 7. A grill 19 is supported from pan 6 as by means of upright studs 20, 21 and 22. Studs 21 and 22 also provide limit stops for central member 13.

Figure 3:
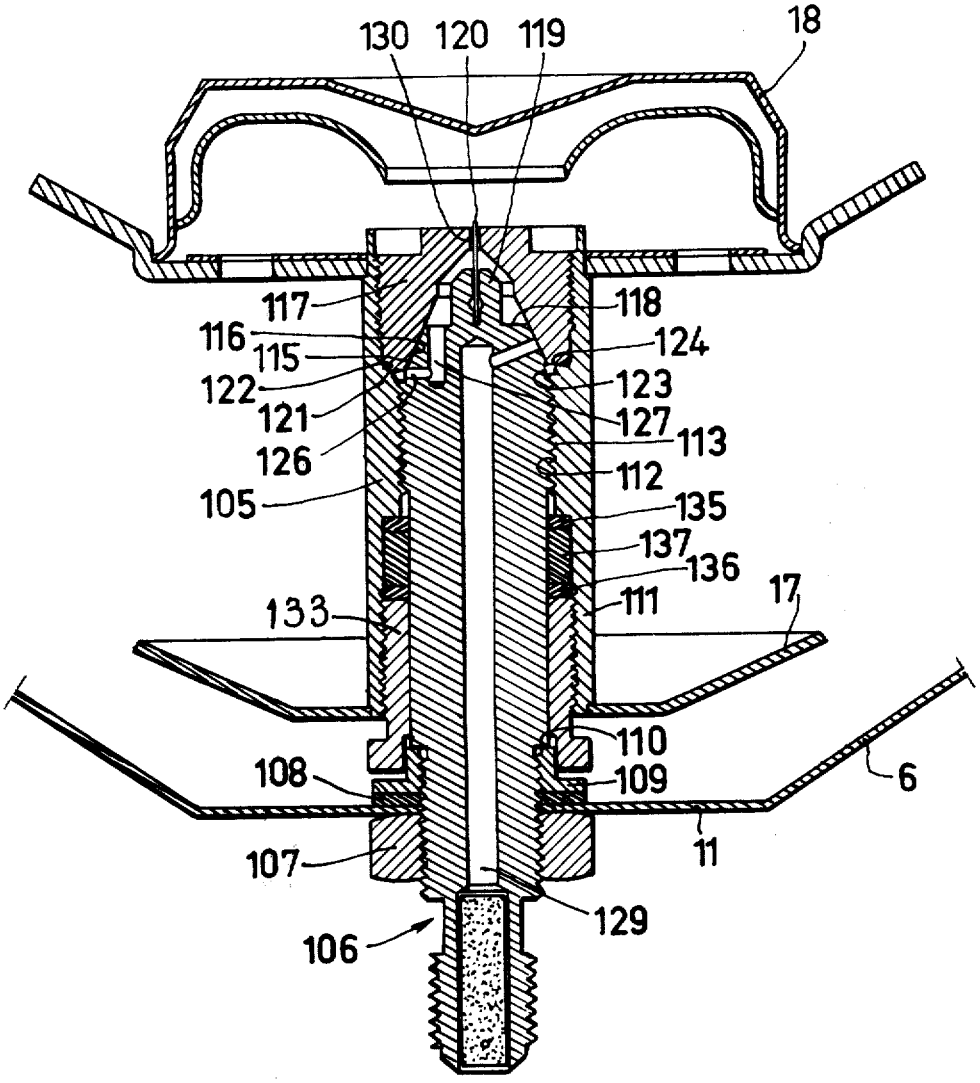
FIG. 3 is a longitudinal half section of the burner of the stove of FIG. 1.
Figure 4:
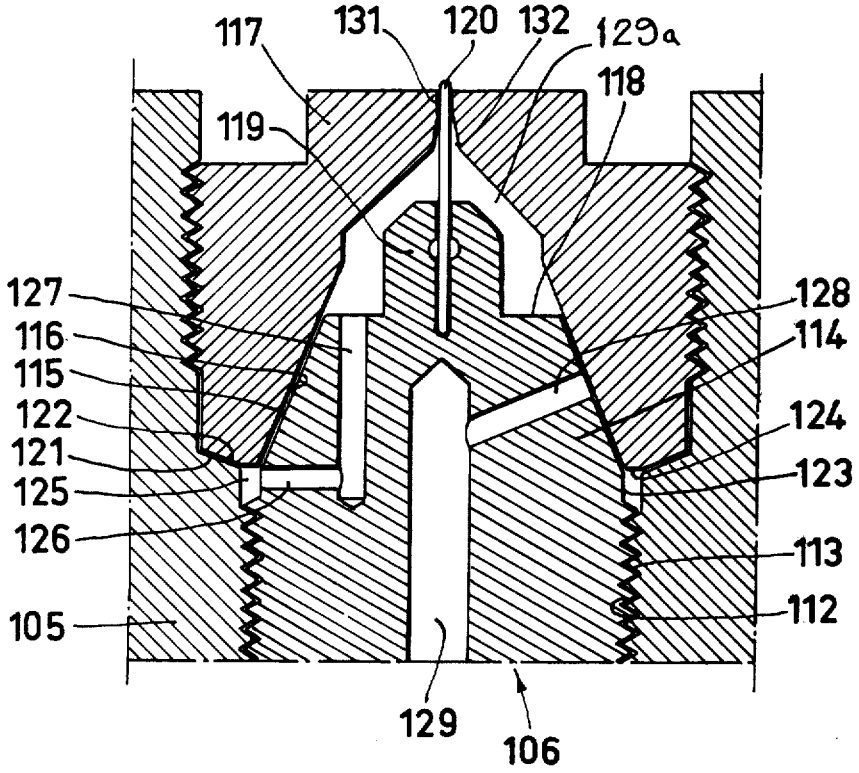
FIG. 4 is an enlarged view of a portion of FIG. 3.

The burner assembly 1 includes a burner body 105 (FIGS. 3 and 4) and an inner stem 106 having a lower portion adapted to receive coupling 10. Body 105 is threadably attached to stem 106 and movable longitudinally with respect thereto. Stem 106 is supported on pan portion 11 by means of a lower nut 107 threadably received thereon together with a sealing washer 108 and a flanged nut 109.

A member 10 having a cylindrical base is received on stem 106 above nut 109 and has a threaded portion receiving threaded portion 111 of body member 105, to compress sealing members as hereinafter described. An internal thread 113 on body 105 engages an external thread 112 on stem 106 to permit relative rotation of body 105 on stem 106 and axial movement of body 105 on stem 106.

The upper portion of stem 106 has defined thereon an inverted frusto-conical or tapered portion 114 formed complimentary to mating surfaces 116 of body member 105. Portion 114 terminates in a surface 118 from which extends a protruding portion 119 having a needle 120 mounted therein and extending upwardly therefrom.

Body member 105 includes a nozzle defining member 117 carried by body member 105 and threadably received in the upper portion thereof. The nozzle member 117 includes thereon the tapered or frusto-conical surface 115 of body member 105. Body member 105 is formed with internal surfaces 121 which receive surfaces 122 of nozzles defining member 117 in sealing engagement.

An annular channel 125 is defined about surface 123 of stem 106 below portion 124 of member 117. A radially directed passage 126 in stem 106 provides communication between passage 125 and a passage 127 leading to a chamber 129a above stem 106. Another passage 128 leads from stem fuel supply passage 129 to chamber 129a.

The opening 130 (FIG. 3) in nozzle member 117 comprises an upper cylindrical portion 131 and a lower tapered portion 132. Cylindrical section 130 has an area only slightly larger than the cross-sectional area of needle 120.

The cylindrical portion of stem 106 is surrounded by metal washers 135 and 136 and a seal 137 as well as sleevelike portion 133 of member 110. This forms a liquid and gas-tight seal between body member 105 and stem 106.

In operation, when the burner is to be turned on, lever member 13 is rotated to the desired position. This will move body member 105 and nozzle member 117 upwardly with respect to stem 106 and needle 120.

The mating threads 112 and 113 have a fairly long pitch which will provide sufficient travel of body member on stem 106 in a little more than 90°, perhaps 120° of rotation. The travel of needle 120 will be from a closed position where the needle 120 almost fills the cylindrical part of the nozzle to a back-off position where the cross-sectional area of the tapered section 132 less the cross-sectional area of the needle 120 is the same as the cylindrical portion 131 of the nozzle. While further travel may be permitted it would serve no useful purpose.

As the body member 105 is initially moved upwardly with respect to stem 106, the fuel under pressure may move through passages 129 and 128 past the parted tapered surfaces 115 and 116, allowing the liquid fuel to flow into the nozzle cavity 129a. However, the needle 120 is still in the cylindrical part of the nozzle opening 130 and the exiting flow of fuel is very limited.

Further rotation of burner body lowers the needle with respect to the opening 131 thereby increasing the area between the needle and the nozzle opening. Thus, the tapered surfaces 115 and 116 function only to open and close a valve defined by passage 128, while the control of flow is accomplished by the relative position of the needle 120 with respect to the end of the tapered part 132 of the nozzle opening.

When the fuel is entering nozzle cavity 129a it will also flow in between threads 112 and 113 and fill the thread cavities down to seals 135 and 137. Fuel will overflow and be caught in overflow pan 17. When this is ignited it will heat the body 105 resulting in vaporization of the fuel for the necessary burning action. While not shown in the drawings it will be understood that there will be several peripheral rows of openings in burner head 18 to permit flow of combustion air. Passages 126 and 127 permits the fuel in the thread cavities to freely expand and vaporize when the burner is preheated. The burner assembly is preferably formed of brass. When liquid fuel is ignited in pre-heat cup 17, body 105 quickly reaches a temperature which will vaporize the fuel.

Besides acting as a flow control, the needle 120 also operates when moved to the closed position to remove any combustion residue such as carbon that may be formed in the nozzle opening.

Figure 5:
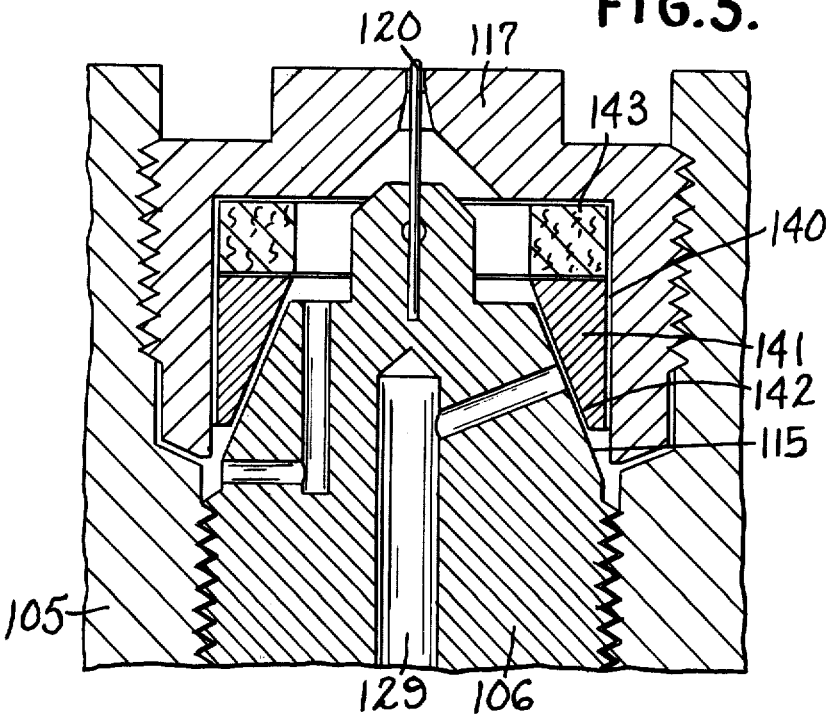
FIG. 5 is a half-sectional view of a portion of another burner construction embodying the invention.

FIG. 5 shows an alternate embodiment of the invention. In this embodiment the nozzle defining member 117 consists of an externally threaded portion threaded to the upper part of the burner body in the same manner as previously described. However, the interior of nozzle-defining member 117 is defined with a cylindrical bore 140 and receives therein an insert 141 which has a tapered surface 142 adapted to seal against the stem surface 115. Insert 141, while held within bore 140, can move axially therein and is backed by a resilient backing member 143. Backing member 143 is preferably of asbestos. The purpose of this construction is to facilitate opening of the burner, since when the burner is operated the burner body 105 and stem 106 assume different temperatures, and when the burner has been turned off, body 105 contracts more than stem 106 which could tend to lock the burner in a closed position. With the arrangement shown in FIG. 5, the pressure between the tapered surfaces 115 and 116 is relieved by the resiliency of the member 143.

From the foregoing disclosure it may be seen that the objects of the invention are efficiently attained. While preferred embodiments of the invention have been set forth for purposes of disclosure, it is to be understood that other embodiments to the invention as well as modifications to the disclosed embodiment which do not depart from the spirit and scope of the invention may become apparent to those skilled in the art. Accordingly, the appended claims are intended to cover all embodiments and modifications of the invention which do not depart from the spirit and scope of the invention.

What is claimed is:

1. A burner assembly for liquid fuels comprising a stem member having an axial fuel passage therein, a body member engaging said stem member and axially movable thereon upon relative rotation therebetween, a valve defined between said stem [ passage ] *member* and said body member, said body member including a nozzle having a cylindrical portion and a lower tapered portion, a needle extending into *and substantially filling* said cylindrical portion of said nozzle *to close said nozzle* when [ the assembly ] *said valve* is in a closed position and *the end of said needle* being retractable into said tapered portion to control the nozzle opening when said body is moved relative to said stem to open said valve.

2. The burner of claim 1 wherein said stem and said body member have mating tapered surfaces which define said valve.

3. The burner of claim 2 wherein the tapered surface of said body member is defined on a movable insert backed by a resilient member.

4. The burner of claim 2 wherein said stem member has the tapered portion on the upper end thereof and a fuel passage is defined in said stem through said tapered surface to said axial passage.

5. The burner of claim 1 wherein said nozzle is defined in a nozzle member threadably received in said body member, and said nozzle member also provides the tapered surface of said body member.

6. The burner assembly of claim 1 further including a stove body including a dished portion, means supporting said burner assembly in said dished portion and means coupled to said body member and extending radially therefrom beyond said dished portion for rotating said body.

7. The assembly of claim 6 wherein said extending means is movable in an arc on a flat portion of said stove body.

8. The burner assembly of claim 1 wherein said rotation of said body member substantially 90° about said stem moves said burner between full open and full closed positions.

*9. The burner of claim 1 wherein the portion of said needle extending into said nozzle has a uniform cross section.*

*10. The burner of claim 1 wherein the cross-sectional area of the lowered tapered portion of said nozzle less the cross-sectional area of said needle is substantially the same as the cross-sectional area of the cylindrical portion of said nozzle.*

* * * * *